(12) United States Patent
Machii et al.

(10) Patent No.: US 12,479,442 B2
(45) Date of Patent: Nov. 25, 2025

(54) TRAVEL ROAD RECOGNITION DEVICE

(71) Applicant: Hitachi Astemo, Ltd., Hitachinaka (JP)

(72) Inventors: Kimiyoshi Machii, Tokyo (JP); Takehito Ogata, Tokyo (JP); Noriyasu Hasejima, Tokyo (JP); Masayoshi Kuroda, Hitachinaka (JP); Kosuke Sakata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 603 days.

(21) Appl. No.: 17/426,775

(22) PCT Filed: Jan. 30, 2020

(86) PCT No.: PCT/JP2020/003317
§ 371 (c)(1),
(2) Date: Jul. 29, 2021

(87) PCT Pub. No.: WO2020/170745
PCT Pub. Date: Aug. 27, 2020

(65) Prior Publication Data
US 2022/0126836 A1 Apr. 28, 2022

(30) Foreign Application Priority Data
Feb. 21, 2019 (JP) .................. 2019-029840

(51) Int. Cl.
*B60W 40/076* (2012.01)
*B60W 60/00* (2020.01)
(Continued)

(52) U.S. Cl.
CPC ........ *B60W 40/076* (2013.01); *B60W 60/001* (2020.02); *G01S 17/89* (2013.01);
(Continued)

(58) Field of Classification Search
CPC ............. B60W 40/076; B60W 60/001; B60W 2552/15; B60W 2552/53; B60W 2556/40;
(Continued)

(56) References Cited

U.S. PATENT DOCUMENTS

2010/0017060 A1\* 1/2010 Zhang ................... G01S 17/89
2010/0034426 A1    2/2010 Takiguchi et al.
(Continued)

FOREIGN PATENT DOCUMENTS

CN        101617197 A    12/2009
CN        109017780 A    12/2018
(Continued)

OTHER PUBLICATIONS

Office Action corresponding to Chinese Application No. 202080006348. 5, dated Jul. 4, 2022 (19 pages).
(Continued)

*Primary Examiner* — Ramon A. Mercado
*Assistant Examiner* — Ellis B. Ramirez
(74) *Attorney, Agent, or Firm* — Foley & Lardner LLP

(57) ABSTRACT

Provided is a travel road recognition device that can accurately recognize a travel road end of a travel road on which an own vehicle travels. A travel road recognition device of the present invention is a travel road recognition device that recognizes the travel road end of the travel road on which an own vehicle 301 travels, and includes: a laser radar 101 that emits a laser bean from the own vehicle 301 toward the travel road; a road surface determination unit 203 that obtains a cross slope of the travel road based on coordinate values of a point cloud obtained by the laser radar 101; and a road end determination unit 204 that obtains a change point at which a slope angle changes in the cross slope of the travel road obtained by the road surface determination unit 203, and obtains coordinate values of at least one travel road end
(Continued)

of both sides in a cross direction of the travel road based on the coordinate values of the change point.

5 Claims, 19 Drawing Sheets

(51) Int. Cl.
  *G01S 17/89* (2020.01)
  *G06V 20/56* (2022.01)
(52) U.S. Cl.
  CPC ....... *G06V 20/588* (2022.01); *B60W 2552/15* (2020.02); *B60W 2552/53* (2020.02); *B60W 2556/40* (2020.02)
(58) Field of Classification Search
  CPC ..... G01S 17/89; G01S 17/931; G06V 20/588; G01C 21/26; G01C 21/3461; G08G 1/16
  USPC .......................................... 701/1, 65, 80, 437
  See application file for complete search history.

(56) References Cited

U.S. PATENT DOCUMENTS

| | | | |
|---|---|---|---|
| 2011/0227781 A1* | 9/2011 | Nitanda | G06V 20/588 |
| 2011/0309967 A1 | 12/2011 | Choe et al. | |
| 2012/0140039 A1* | 6/2012 | Ota | B60W 30/12 |
| 2015/0120244 A1* | 4/2015 | Ma | G06T 7/75 |
| 2017/0039436 A1* | 2/2017 | Chen | G06V 10/454 |
| 2019/0056748 A1* | 2/2019 | Budihal | G06V 10/763 |
| 2019/0122054 A1* | 4/2019 | Kumano | G08G 1/166 |
| 2019/0135281 A1* | 5/2019 | Miura | B60W 30/18163 |
| 2019/0263391 A1* | 8/2019 | Matsunaga | G06V 20/56 |
| 2019/0287256 A1 | 9/2019 | Iwahashi et al. | |
| 2020/0041650 A1* | 2/2020 | Matsui | G01S 7/4817 |
| 2020/0377088 A1* | 12/2020 | Fukushige | B60W 40/105 |
| 2022/0063669 A1* | 3/2022 | Fukushige | B60W 40/08 |

FOREIGN PATENT DOCUMENTS

| | | | |
|---|---|---|---|
| JP | 2000255319 A | * | 9/2000 |
| JP | 2008-165610 A | | 7/2008 |
| JP | 2017-015409 A | | 1/2017 |
| WO | WO-2008/099915 A1 | | 8/2008 |
| WO | WO-2018/105476 A1 | | 6/2018 |

OTHER PUBLICATIONS

International Search Report with English translation and Written Opinion issued in corresponding application No. PCT/JP2020/003317 dated May 26, 2020.

* cited by examiner

FIG. 16

| | | | |
|---|---|---|---|
| 1600 | | LAYER NUMBER — 1601 | |
| | | NUMBER OF POINTS — 1602 | |
| | 1610 — LAYER INFORMATION | POINT CLOUD INFORMATION | x-COORDINATE — 1611 |
| | | | y-COORDINATE — 1612 |
| | | | z-COORDINATE — 1613 |
| | | | REFLECTION INTENSITY — 1614 |
| | | ⋮ | |
| ⋮ | | | |

TRAVEL ROAD RECOGNITION DEVICE

TECHNICAL FIELD

The present invention relates to a travel road device that recognizes a travelable region in a vehicle traveling environment.

BACKGROUND ART

As a background art of the present technical field, PTL 1 discloses a road lane marking recognition device that includes imaging means that images vehicle surroundings and recognizes a lane marking by analyzing an image captured by the imaging means. The device includes first target position specifying means that specifies a first target laid on a road, and in a road sectioned by the first target and a second target different from the first target, when the lane marking is to be recognized based on a position of the second target in the image captured by the imaging means, an image analysis region for second target recognition configured to recognize the second target is set on the front side and/or the back side of a position on the image captured by the imaging means corresponding to a position of the first target specified by the first target position specifying means.

CITATION LIST

Patent Literature

PTL 1: JP 2008-165610 A

SUMMARY OF INVENTION

Technical Problem

In automatic driving by an automatic driving vehicle, highly accurate lane recognition applicable to lane change and lane keeping is required. PTL 1 discloses the lane marking recognition device using a camera, and describes that it is possible to realize driving support functions such as lane keeping and lane change by using the recognition result.

However, in the case in which the camera is used as recognition means, there is a disadvantage that the recognition performance using the camera greatly changes depending on the surrounding environment such as brightness and weather. Depending on the environment, a travel road end of a travel road on which an own vehicle travels cannot be accurately recognized, which may affect the automatic driving control of the own vehicle.

The present invention has been made in view of the above points, and an object of the present invention is to provide a travel road recognition device that can accurately recognize a travel road end of a travel road on which an own vehicle travels.

Solution to Problem

A travel road recognition device of the present invention that solves the above problem is a travel road recognition device that recognizes a travel road end of a travel road on which an own vehicle travels, and includes: a laser radar that emits a laser beam from the own vehicle toward the travel road; a road surface determination unit that obtains a cross slope of the travel road based on coordinate values of a point cloud obtained by the laser radar; and a road end determination unit that obtains a change point at which a slope angle changes in the cross slope of the travel road obtained by the road surface determination unit, and obtains coordinate values of at least one travel road end of both sides in a cross direction of the travel road based on the coordinate values of the change point.

Advantageous Effects of Invention

According to the present invention, it is possible to accurately recognize the travel road end of the travel road on which the own vehicle travels. Therefore, the automatic driving vehicle can be operated safely. Further features related to the present invention will become apparent from the description of the present description and the accompanying drawings. Problems, configurations, and effects other than those described above will become apparent from the following description of the embodiments.

BRIEF DESCRIPTION OF DRAWINGS

FIG. 16 is a diagram explaining a data structure of the point cloud data.

DESCRIPTION OF EMBODIMENTS

Figure 1:
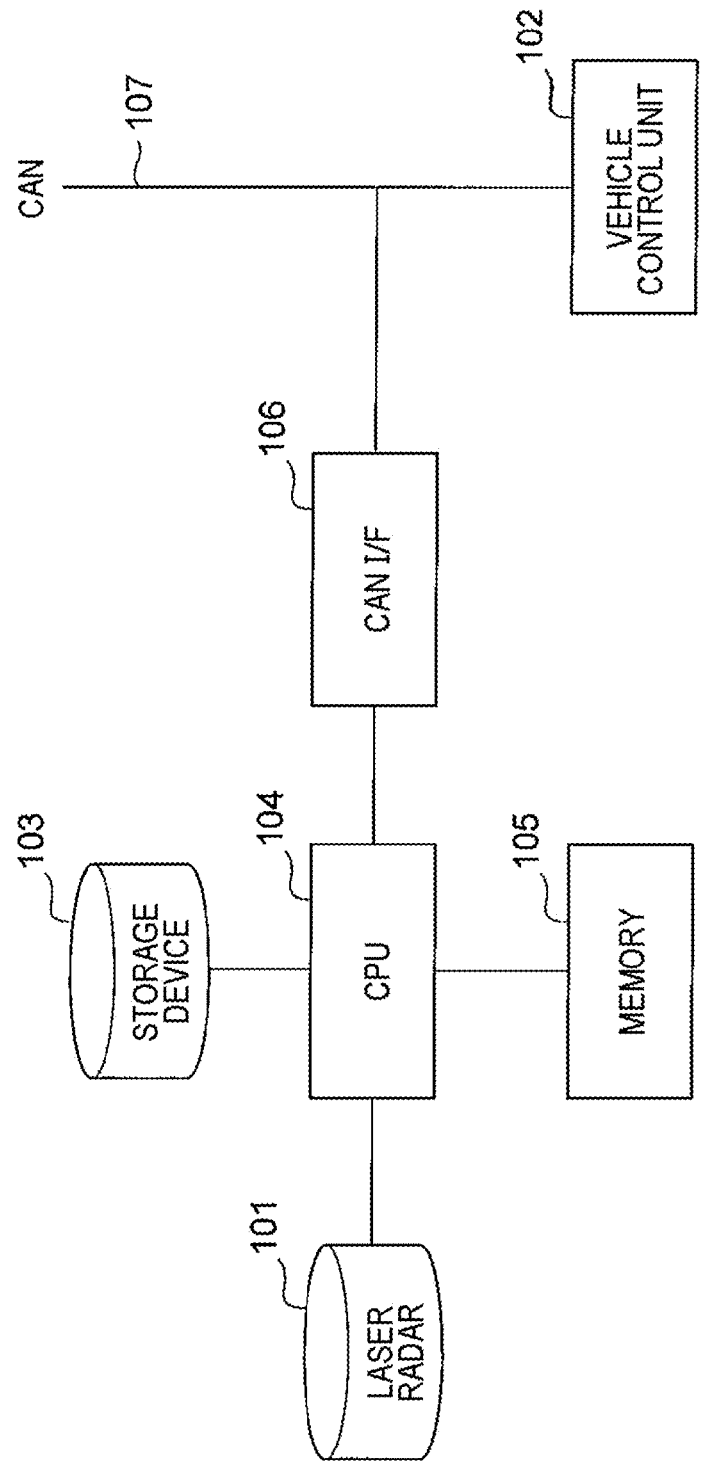
FIG. 1 is a diagram illustrating a hardware configuration example of a travel road recognition device according to an embodiment of the present invention.

Next, a travel road recognition device according to an embodiment to which the travel road recognition device of the present invention is applied is described.

The travel road recognition device of the present embodiment is a device that recognizes a travel road end of a travel road on which an own vehicle travels and is mounted on the own vehicle that performs automatic driving. The information on the travel road end recognized by the travel road recognition device is supplied to a vehicle control unit of the own vehicle and used for control of automatic driving.

FIG. is a diagram illustrating a hardware configuration example of a travel road recognition device according to the embodiment of the present invention.

The travel road recognition device 100 of the present embodiment includes a laser radar 101 for monitoring the surroundings of the vehicle, a storage device 103 for storing map information and the like, a central processing unit (CPU) 104, and a memory 105. In the present embodiment, the travel road recognition device 100 in which the laser radar 101 is also included in the configuration is described as an example. However, the travel road recognition device may be configured to acquire data from the laser radar 101 without including the laser radar 101.

The laser radar 101 is mounted on the own vehicle, emits a laser beam from the own vehicle, and acquires data using a reflected wave, and for example, Light Detection And Ranging (LiDAR) is used. The laser radar 101 vertically superimposes a plurality of laser beams in a layer shape, emits the laser beams while rotating the laser beams, and obtains data such as three-dimensional coordinates and reflection intensity of a position where the laser beams are reflected by using the reflected waves. This data is generally referred to as point cloud data.

The laser radar 101 acquires the point cloud data for each of a plurality of layers at predetermined intervals in a direction away from the own vehicle. Unlike the camera, the laser radar 101 can obtain point cloud data without depending on the brightness of the surroundings, and can detect an object regardless of day and night. The point cloud data obtained by the laser radar 101 is transmitted from the CPU 104 to the memory 105 and stored in, for example, a buffer having a data structure of the point cloud data illustrated in FIG. 16. The laser radar 101 emits the laser beam in a layered manner from the own vehicle, and can acquire a plurality pieces of point cloud data in each layer.

The CPU 104 processes the point cloud data obtained by the laser radar 101, and stores data required in the process and processing results in the memory 105. Then, the CPU 104 performs processing of causing the information of the processing result to flow from a controller area network interface (CAN_I/F) 106 to a controller area network bus (CAN bus) 107 and to be transmitted to the vehicle control unit 102 through the CAN bus 107. The vehicle control unit 102 controls the traveling direction and the speed of the vehicle, and this is realized by capturing the processing result of the travel road recognition processing by the CPU 104. Further, the CPU 104 is configured to be able to acquire dead reckoning information such as the traveling direction and the speed of the vehicle created and stored in the vehicle control unit 102 through the CAN_I/F 106.

Figure 2:
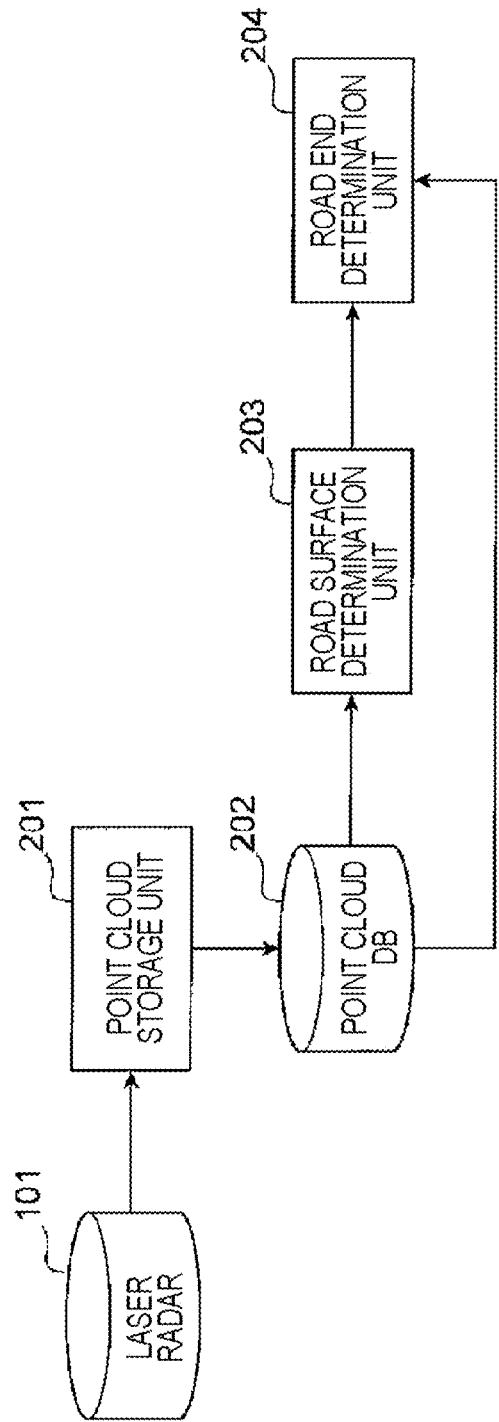
FIG. 2 is a diagram illustrating a software configuration example of the travel road recognition device according to the embodiment of the present invention.

FIG. 2 is a diagram illustrating a software configuration example of the travel road recognition device according to the embodiment of the present invention.

The travel road recognition device 100 includes a point cloud storage unit 201, a point cloud database (DB) 202, a road surface determination unit 203, and a road end determination unit 204. The point cloud storage unit 201, the point cloud DB 202, the road surface determination unit 203, and the road end determination unit 204 are embodied as internal functions of the CPU 104 by executing software for travel road recognition in hardware such as the CPU 104.

The point cloud storage unit 201 stores, in the point cloud DB 202, the point cloud data acquired by the laser radar 101. The road surface determination unit 203 obtains a cross slope of the travel road using the point cloud data stored in the point cloud DB 202. The cross slope of the travel road is a slope in a cross direction of the travel road on which the own vehicle travels, that is, a slope in a road width direction which is a direction orthogonal to a preset traveling direction of the travel road. In general, a road surface of a travel road such as a road is gently inclined along a cross direction in order to improve drainability. This inclination is the cross slope of the travel road, and is obtained by the road surface determination unit 203 using the point cloud data.

The travel road end determination unit 204 obtains a change point at which the slope angle changes in the cross slope of the travel road, and obtains coordinate values of at least one of both sides of the travel road in the cross direction based on the coordinate values of the change point. Here, when the coordinate values of the travel road ends on both sides in the cross direction of the travel road are obtained, the travel road on which the own vehicle can travel is between the travel road ends on both sides in the cross direction. The concept of the travel road end includes, for example, at least one of the change point of the cross slope of the travel road, a structure such as a curbstone or a shoulder, and a lane marking. A determination method by the road end determination unit 204 is described later.

Figure 3:
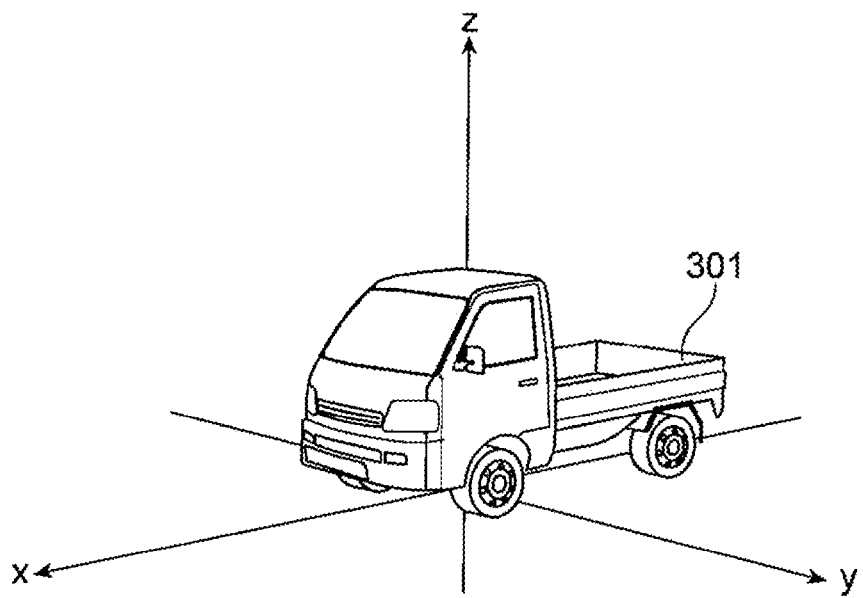
FIG. 3 is a diagram explaining an example of a coordinate system used in the present embodiment.

FIG. 3 is a diagram illustrating an example of a coordinate system used in the present embodiment.

In the present embodiment, a coordinate system with the position of the own vehicle 301 as an origin is used, and the traveling direction of the own vehicle 301 is defined as an x-axis, a direction perpendicular to the x-axis and along a vehicle width direction as a y-axis, and a direction perpendicular to a road surface as a z-axis. In the y-axis, a direction from right to left in the traveling direction of the own vehicle 301 is defined as positive.

Figure 4:
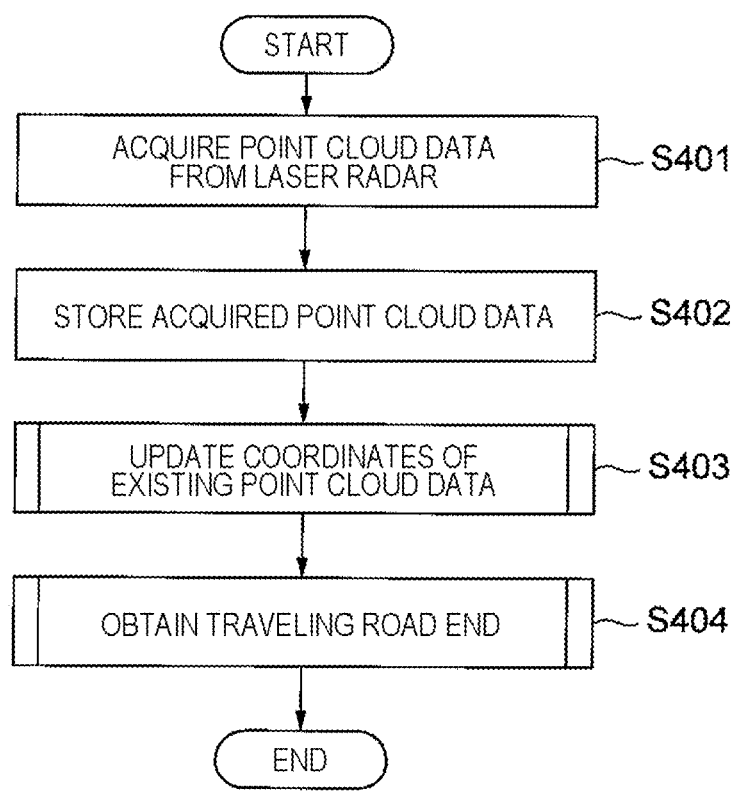
FIG. 4 is a flowchart of overall processing of the travel road recognition device according to the embodiment of the present invention.

FIG. 4 is a flowchart of overall processing of the travel road recognition device according to the embodiment of the present invention.

First, in step 3401, point cloud data is acquired from the laser radar 101, and in step S402, the acquired point cloud data is stored in the point cloud DB 202. Next, in step S403, the coordinate values of the existing point cloud data are updated. Because the point cloud data stored in the point cloud DB 202 in step S402 uses the coordinate system with the position of the own vehicle 301 as the origin, the coordinate values of the existing point cloud data also need to be corrected to those centered on the position of the own vehicle 301 after the movement. This is described later with reference to FIG. 5. After the above processing is completed, the point cloud data in each layer is processed in step S404, and the travel road end in each layer is obtained.

The processing in step S404 is also described below.

Figure 5:
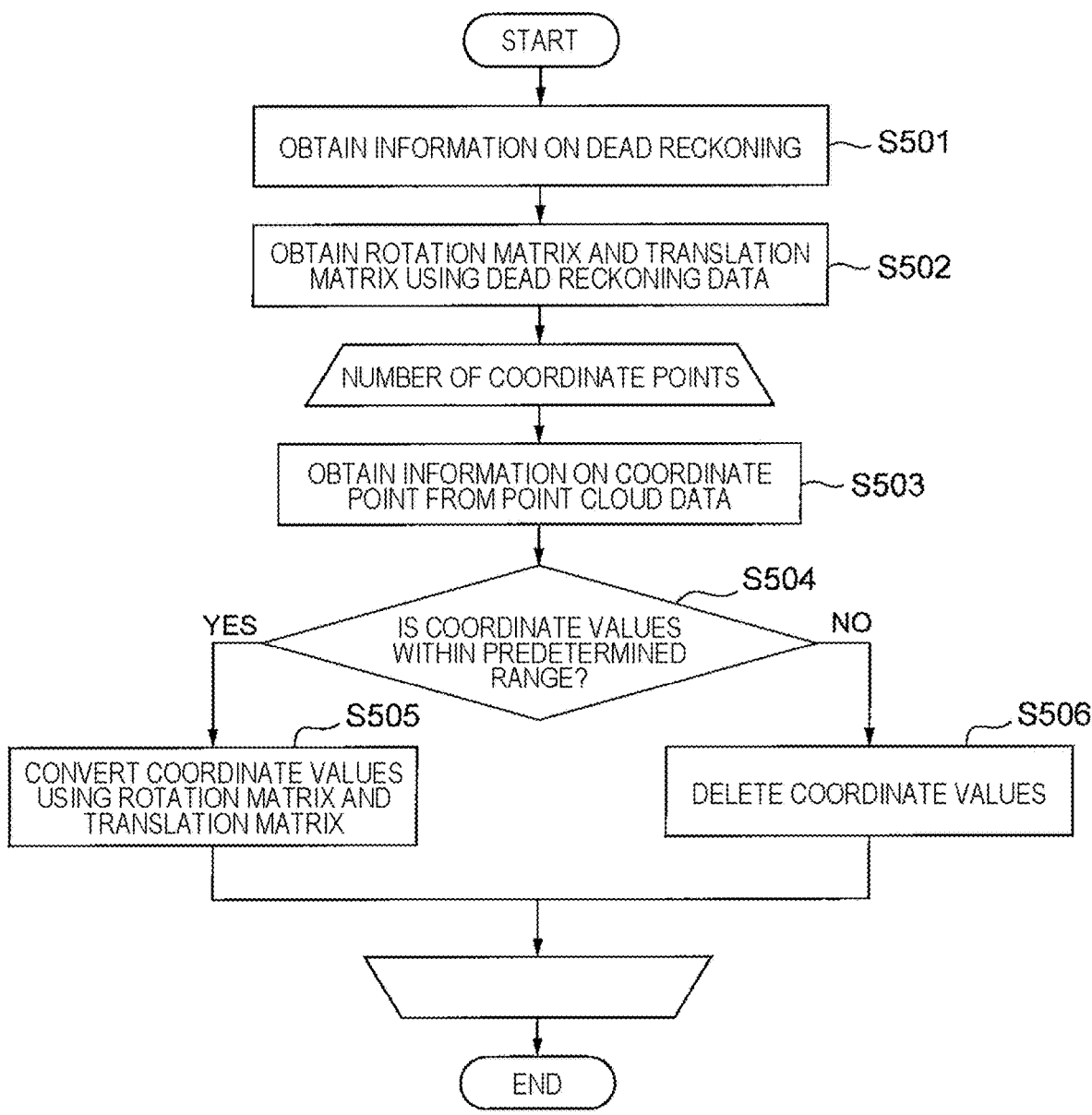
FIG. 5 is a flowchart of processing of updating coordinate values of point cloud data.

FIG. 5 is a flowchart of processing of updating the coordinate values of the point cloud data in step S403.

First, in step S501, information on dead reckoning is obtained. The dead reckoning is processing of obtaining the position of the own vehicle based on the traveling direction and the travel distance of the own vehicle. The information on the dead reckoning is provided from the CAN 107 to the CPU 104 through the CAN_I/F 106. In step S501, a difference in the travel distance and the traveling direction from the point of time when the own vehicle position was measured in the previous time is obtained.

Next, in step S502, a rotation matrix and a translation matrix are obtained by using the obtained data of dead reckoning. Then, these matrices are applied to all the existing data in the point cloud DB 202, and coordinate transformation is performed. In step S503, information on coordinate values is obtained from the point cloud data, and in step S504, it is determined whether or not the coordinate values are within a predetermined range. Specifically, for example, a range such as within a radius of 60 m is determined in advance on the basis of the own vehicle position in the previous time. If the coordinate values are within the predetermined range, the processing proceeds to step S505, and the coordinate values are converted by applying the matrix obtained in step S502. If the coordinate values are outside the predetermined range, the processing proceeds to step S506, and the coordinate values are deleted from the point cloud DB 202. By deleting the coordinate values outside the predetermined range from the point cloud DB 202 in this manner, the amount of data stored in the point cloud DB 202 can be saved. Furthermore, by enabling reference to only the most recently obtained point cloud data, only the point cloud data around the present location of the own vehicle is used.

Figure 6:
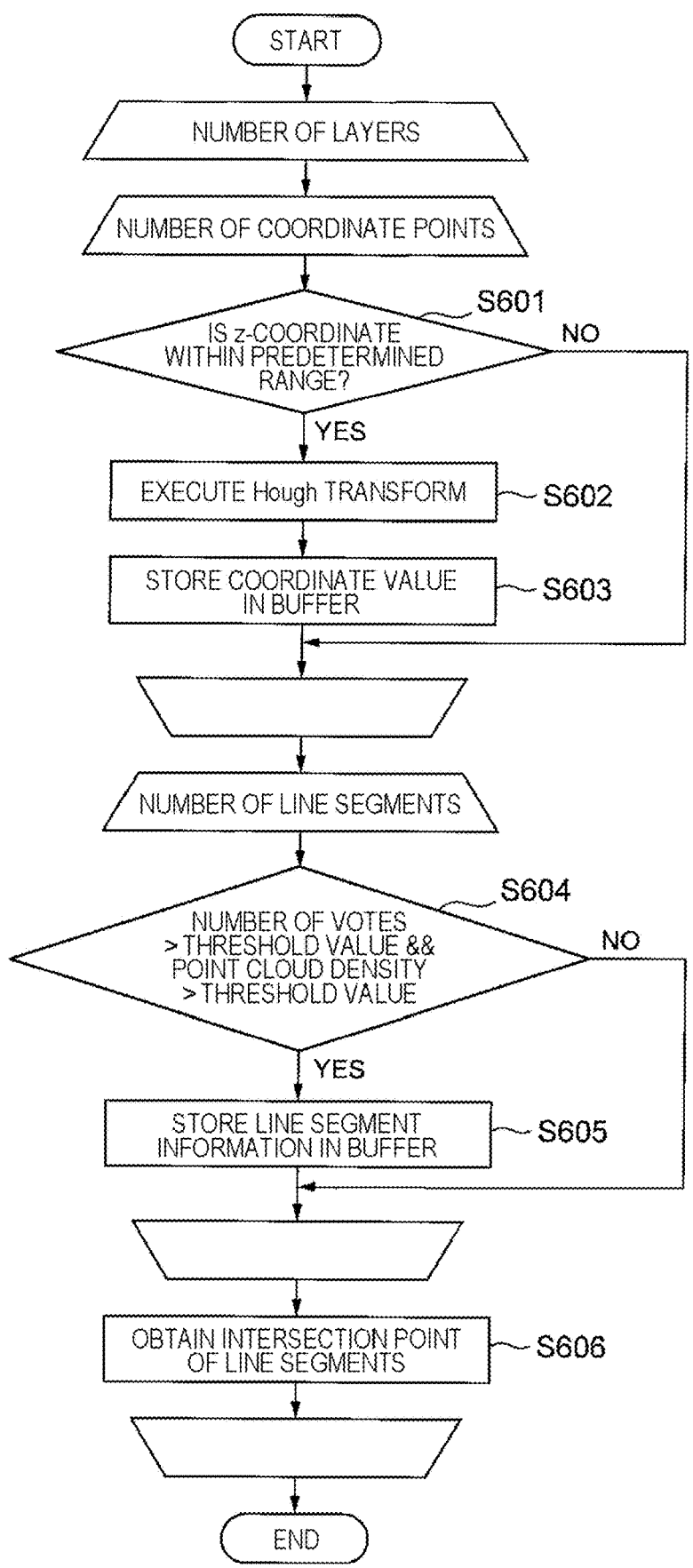
FIG. 6 is a flowchart of processing of obtaining a travel road end from a change point of a cross slope.

FIG. 6 is an example of a flow of the processing of obtaining the travel road end in step S404, and is a flowchart of the processing of obtaining the travel road end from the change point of the cross slope of the travel road.

The processing of obtaining the travel road end is performed in the road end determination unit 204. In the processing of obtaining the travel road end, as illustrated in the flow of FIG. 6, first, the processing enters a loop for the number of layers. Then, in this loop, the processing further enters a loop for the number of pieces of point cloud data. In step S601, it is determined whether or not the z-coordinate of the point cloud data is within a predetermined range. This is to roughly determine whether or not the position of the point cloud is on the road surface, and regarding the predetermined range, a range predicted to be data on the road surface is determined in advance.

Figure 17:
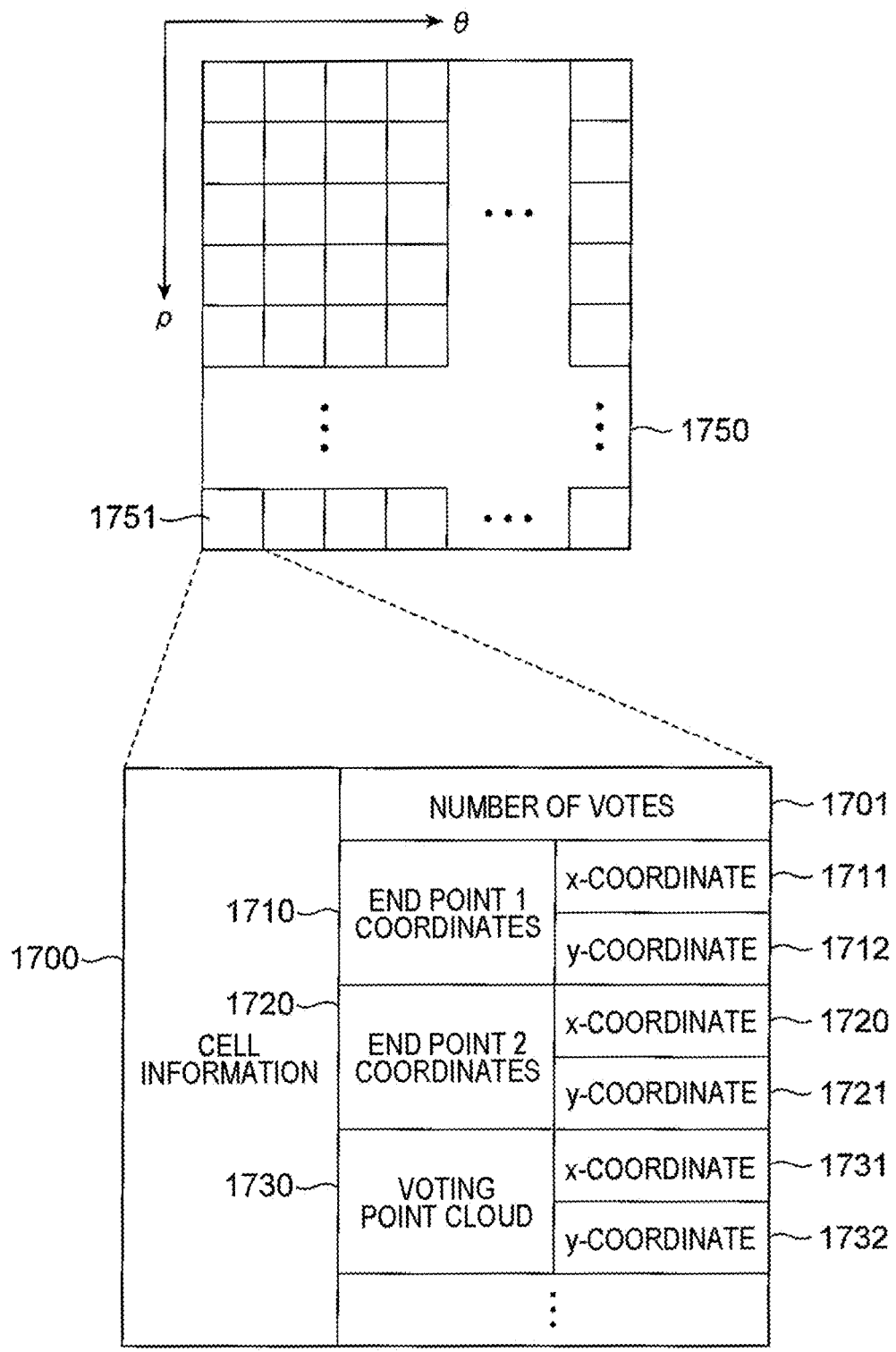
FIG. 17 is a diagram explaining a voting space used in the Hough transform and a data structure thereof.

If the z-coordinate is within the predetermined range, the processing proceeds to step S602, and the Hough transform is executed. A voting space used in the Hough transform has, for example, a configuration illustrated in FIG. 17. FIG. 17 is a diagram illustrating the voting space used in the Hough transform and a data structure thereof. Note that, because the Hough transform has a high processing cost, it is necessary to narrow an angle range for voting or to set a pitch value of an angle in advance to allow the processing to be within a desired processing time period. Details thereof are omitted here.

Next, the processing proceeds to step S603, and the coordinate values, which are the point cloud data of the point cloud having the z-coordinate within the predetermined range, are stored in the buffer. This buffer is a buffer for storing the point cloud data on the road surface of the travel road.

When the above processing is completed for all the coordinate points, the processing enters a loop for the number of line segments obtained by the Hough transform. In order to obtain the line segment by the Hough transform, a threshold value of the number of votes is determined in advance, or the density of points voted on the line segment is determined. This determination is step S604.

If the number of votes and the density of points satisfy the conditions, the processing proceeds to step S605, and information on the line segments is stored in the buffer. This buffer is for storing the line segment information, and has, for example, a data structure similar to that of cell information 1700 of FIG. 17. When the processing for all the line segments is completed, an intersection point of the line segments stored in the buffer is obtained. This intersection point corresponds to the change point of the cross slope of the travel road, and is the travel road end.

If this processing is executed for all the layers, intersection points 721 and 722 (see FIG. 7) are obtained for the number of layers. By connecting these intersection points, it is possible to finally obtain the travel road end. Note that by storing the above in time series, it is possible to obtain data of the travel road end having a higher density.

In addition, the road end determination unit 204 performs, based on the coordinate values of the point cloud, processing of detecting the road surface of the travel road and the structure installed on at least one of the travel road ends of the travel road, obtains the coordinate values of a change point of height between the road surface of the travel road and the structure, and based on the coordinate values of the change point, obtains the position of the travel road end. With this processing, it is possible to detect a boundary between the road surface of the travel road and the structure installed at the travel road end, and to set the boundary as the travel road end.

Figure 7:
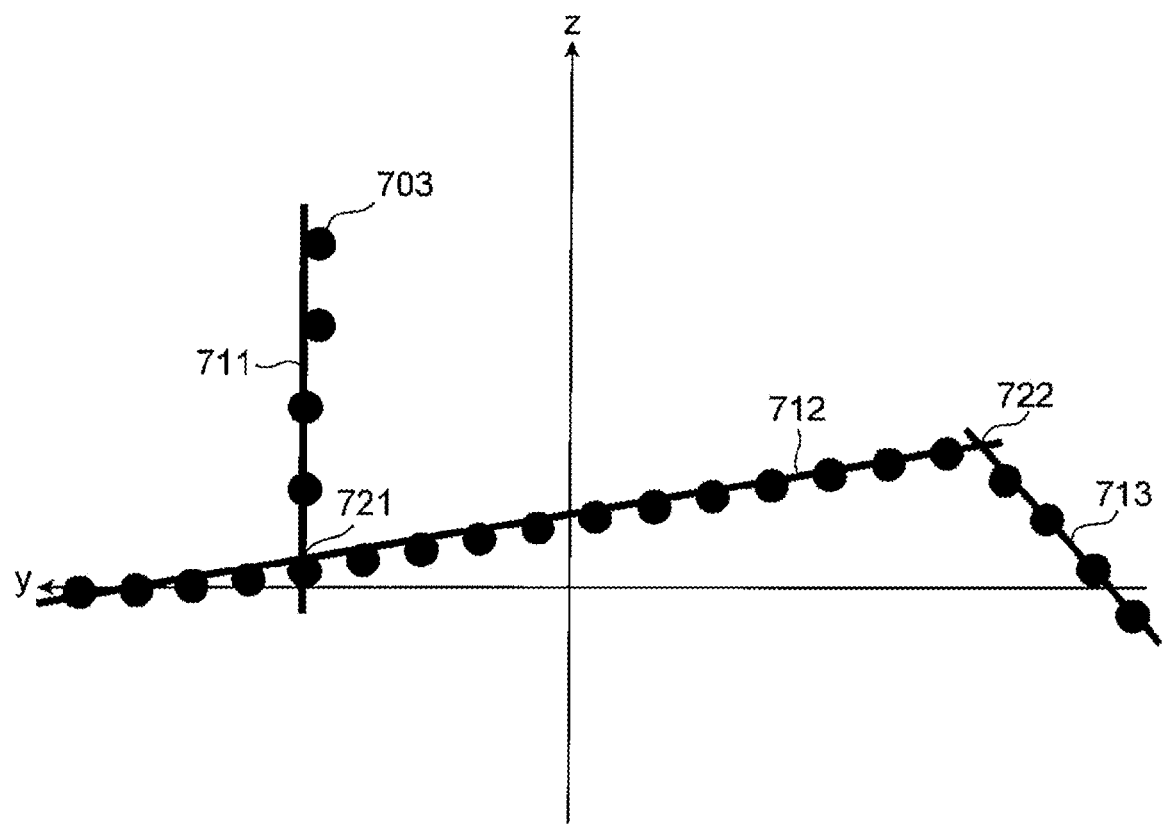
FIG. 7 is a yz plan view illustrating an example of point cloud data and a cross slope.

The processing of FIG. 6 is further described with reference to FIG. 7. FIG. 7 is a yz plan view illustrating an example of the point cloud data and the cross slope, and is an example in which a point cloud 703 whose Z-coordinate is determined to be in the predetermined range in step S601 is expressed on the yz plane. Line segments 711, 712, and 713 are obtained by the processing up to step S605 performed on the point cloud data of the point cloud 703.

The line segment 711 is a line segment obtained by a structure such as a curbstone located on the left side of the own vehicle 301. The line segment 712 is a line segment obtained by the road surface of an own vehicle lane (travel road). The line segment 713 is a line segment obtained by the road surface of the opposite lane. The intersection point 721 is a change point of height between the road surface of the travel road and the structure, and the intersection point 722 is a change point at which the slope angle changes in the cross slope of the travel road. The intersection points 721 and 722 indicate coordinate values of the travel road ends on both sides in the cross direction of the travel road, and a space between the intersection points 721 and 722 is a width in which the own vehicle can travel. Therefore, it is possible to recognize the minimum travel road on which the own vehicle can travel.

Normally, in order to drain such as rainwater, the road has a slope gently descending from a travel road end on one side in the cross direction of the travel road toward a travel road end on the other side in the cross direction of the travel road. For example, in a road having one-lane on each side, a slope of about 1° is provided such that the height gradually decreases from the center of the road between the own vehicle lane and the opposite lane toward the road end. By detecting this slope with the laser radar 101, the own vehicle lane and the opposite lane can be determined. In the example of FIG. 7, the line segment 712 is the own vehicle lane, and the line segment 713 is the opposite lane. The intersection point 722 of the line segments 712 and 713 is the center of the road.

Next, an example of another processing of obtaining the travel road end is described. In FIG. 6, an example of the processing of obtaining the travel road end from the change point of the cross slope of the travel road has been described, but the determination of a lane marking can be added to obtain the travel road end with higher accuracy. The lane marking includes, for example, a lane boundary marking (so-called center line) between the own vehicle lane and the opposite lane, and a roadway edge marking located on the opposite side of the lane boundary marking with the own vehicle lane interposed therebetween.

Figure 8:
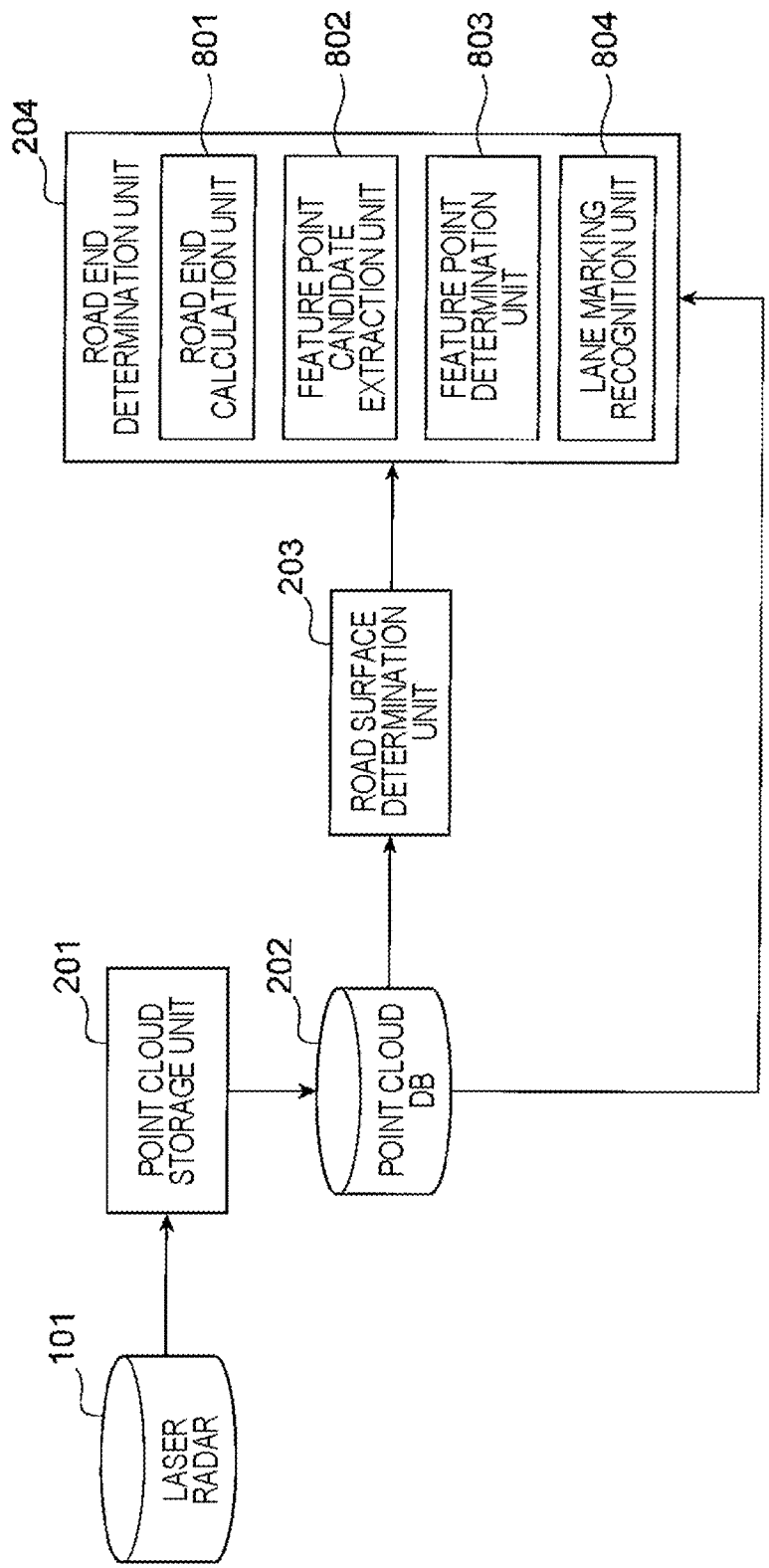
FIG. 8 is a diagram illustrating a software configuration example of the travel road recognition device in the case in which a lane marking is used.

FIG. 8 is a diagram illustrating a software configuration example of the travel road recognition device in the case in which the lane marking is used. As illustrated in FIG. 8, the road end determination unit 204 includes a road end calculation unit 801, a feature point candidate extraction unit 802, a feature point determination unit 803, and a lane marking recognition unit 804 as processing modules in the case in which the lane marking is used.

The road end calculation unit 801 obtains the cross slope of the travel road and a change point of the slope, and obtains the travel road end based on the coordinate position of the change point. The feature point candidate extraction unit 802 obtains feature point candidates constituting a lane marking based on coordinate values and reflection intensity of point cloud data obtained by irradiating the road surface with the laser beam. The feature point candidate extraction unit 802 performs processing of extracting a piece of point cloud data having the reflection intensity higher than a threshold value from among the pieces of the point cloud data obtained by the laser radar 101, as a feature point candidate of the lane marking marked on the road surface. The feature point determination unit 803 obtains feature points of the lane marking from among the feature point candidates based on the coordinate values of the travel road end obtained by the road end calculation unit 801.

For example, the feature point determination unit 803 narrows down the feature point candidates obtained by the feature point candidate extraction unit 802 to the feature point candidates existing in the vicinity of the travel road end obtained by the road end calculation unit 801, and determines the narrowed-down feature point candidates as the feature points. By this narrowing down, for example, road surface painting such as an arrow existing at the center position of the travel road can be excluded from the candidates of the travel road end. The lane marking recognition unit 804 recognizes the lane marking by using the feature points obtained by the feature point determination unit 803, and performs processing of setting the lane marking as the travel road end.

Next, the processing of the road end determination unit 204 is described.

Figure 9:
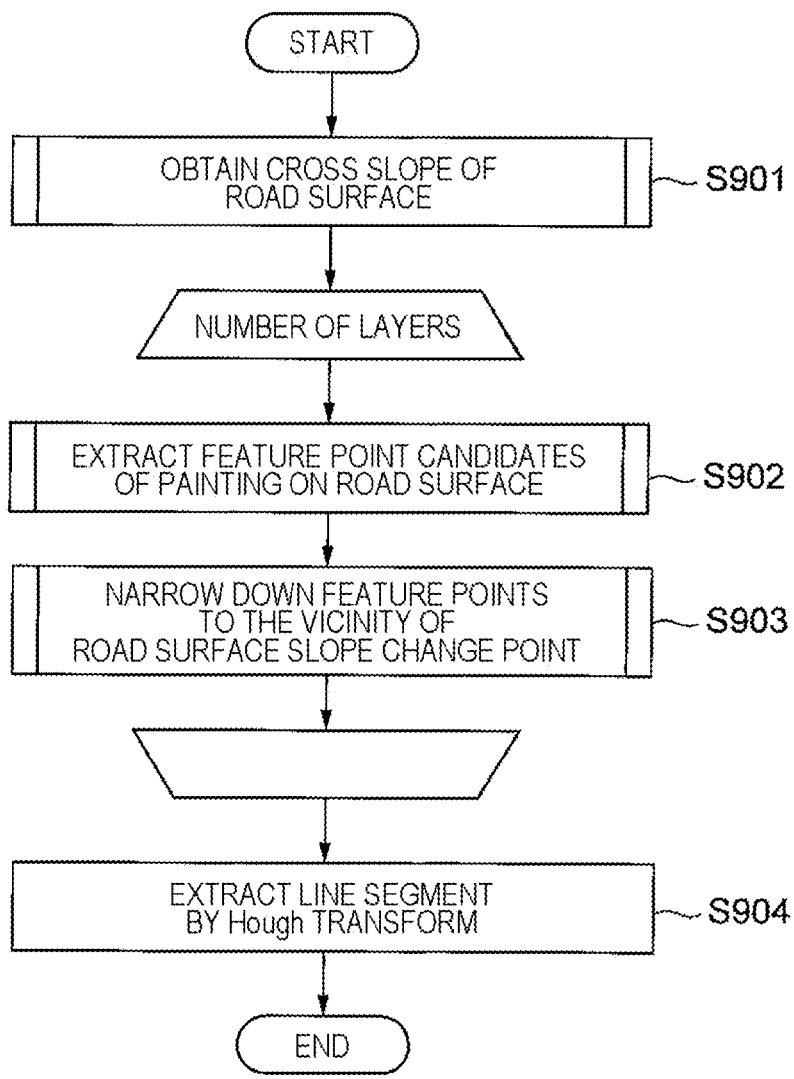
FIG. 9 is a flowchart of processing of obtaining the lane marking.

FIG. 9 is a flowchart of processing of obtaining a lane marking to be the travel road end, and corresponds to the processing of step S404. If the lane marking exists on the road surface, it is desirable that the position of the lane marking be set to the travel road end. Alternately, if there is no lane marking on the road surface, the intersection points 721 and 722 obtained by the processing of FIG. 6 can be set as the travel road end.

First, in step S901, the cross slope of the travel road is obtained. This processing is described later again with reference to FIGS. 12 and 13.

Thereafter, the processing enters a loop for the number of layers, and the feature point candidates of road surface painting are extracted in step S902. Because the road surface painting is mixed with a reflector, high reflection intensity can be obtained when the laser beam is emitted by the laser radar 101. The feature point candidates are extracted using this high reflection intensity. This is described later again with reference to FIG. 12.

Next, in step S903, the feature point candidates extracted in step S902 are narrowed down to the vicinity of the intersection points 721 and 722. The term "the vicinity of" means within a predetermined range set in advance with a margin on the side closer to the own vehicle than the intersection points 721 and 722.

After the processing exiting the loop for the number of layers, a line segment is extracted using the Hough transform in step S904. This is processing for the feature point candidates obtained in step S903. Note that the Hough transform is an example of the processing, and the algorithm for extracting the line segment is not limited thereto.

Figure 10:
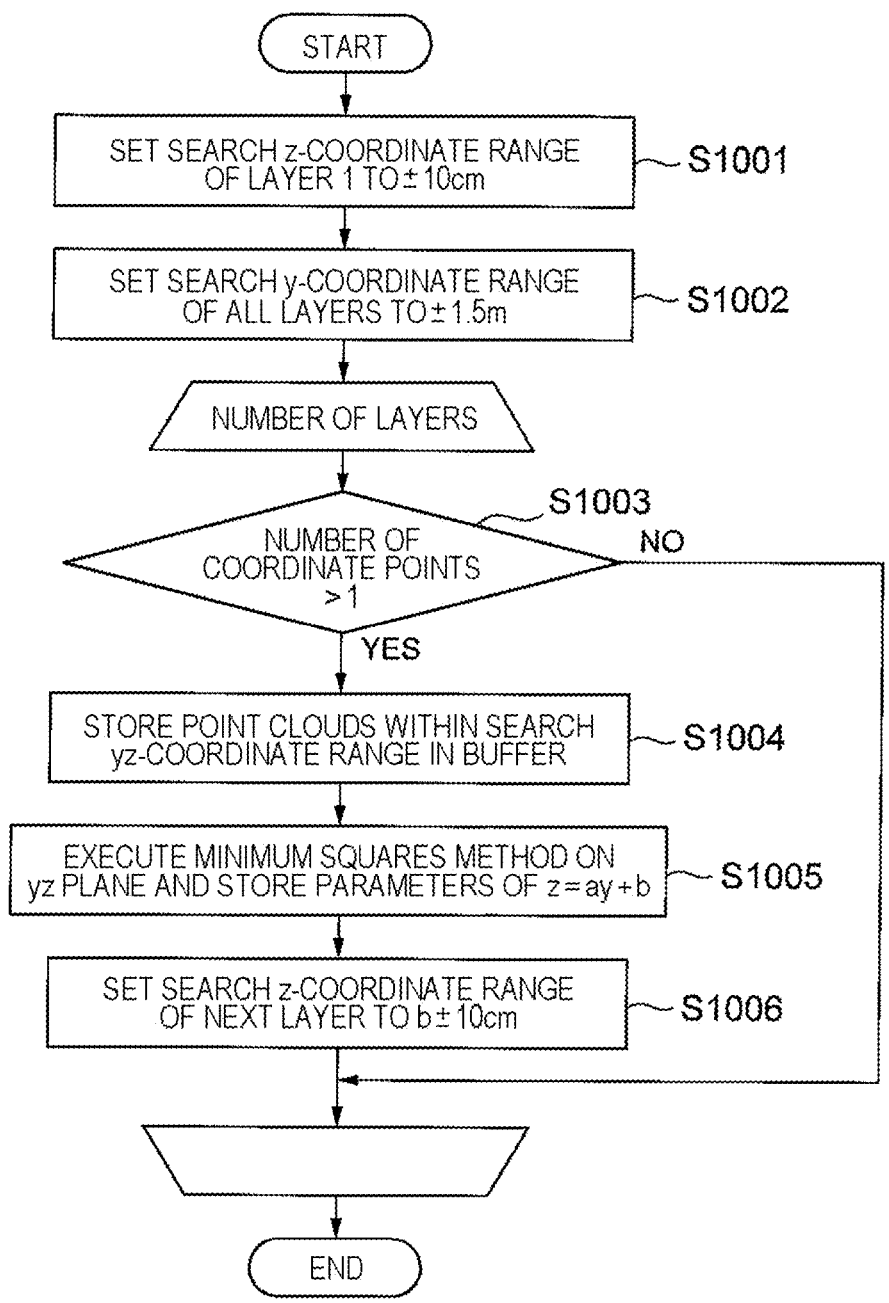
FIG. 10 is a flowchart explaining a method of searching a point cloud.

FIG. 10 is a processing flow for obtaining the cross slope in step S901, and is a flowchart for describing a point cloud search method. First, in step S1001, a search coordinate range in the z-axis direction (search z-coordinate range) of a layer 1 is set to ±10 cm. Here, layer numbers are set in ascending order from the side closer to the own vehicle 301 toward the side away from the own vehicle, and the layer 1 is the layer closest to the own vehicle 301. In step S1002, a search coordinate range in the y-axis direction (search y-coordinate range) of all layers is set to ±1.5 m. This means that the distance is 1.5 m to the sides of the own vehicle, which corresponds to the width of the own vehicle lane. Note that this value is not limited to 1.5 m, and may be optionally set according to the situation.

Next, the processing enters a loop for the number of layers, and the cross slope of the travel road in each layer is obtained. In the loop for the number of layers, the processing is performed in ascending order of the layer numbers. First, in step S1003, the number of point clouds (coordinate points) extracted in the layer is checked. If the number of point clouds is one or less (NO), the cross slope of the travel road cannot be calculated, and thus the processing in the layer is not executed. If the number of point clouds is two or more, the processing proceeds to step S1004 and subsequent steps in order to calculate the cross slope of the travel road.

In step S1004, the point cloud data of the point cloud included in the search yz coordinate range is stored in the buffer. This can be performed by searching all the point clouds detected in each layer. The buffer has a data structure as illustrated in FIG. 16, and it is preferable to secure a memory area different from the point cloud DB 202.

Next, in step S1005, the least squares method is performed on the yz plane and parameters of z=ay b are stored. Specifically, the parameters are values of a and b. The values are held for the number of layers. Next, in step S1006, the search yz-coordinate range of the next layer is set based on b. In the present embodiment, b±10 cm is set. This is to correspond to the case of an upward slope or a downward slope. That is, because the suitable search yz-coordinate range varies depending on the layer, the processing of step S1006 of setting the search yz-coordinate range of the next layer based on b is required. Note that the value of a margin for b can be optionally set according to the situation, and is not limited to 10 cm.

Figure 11:
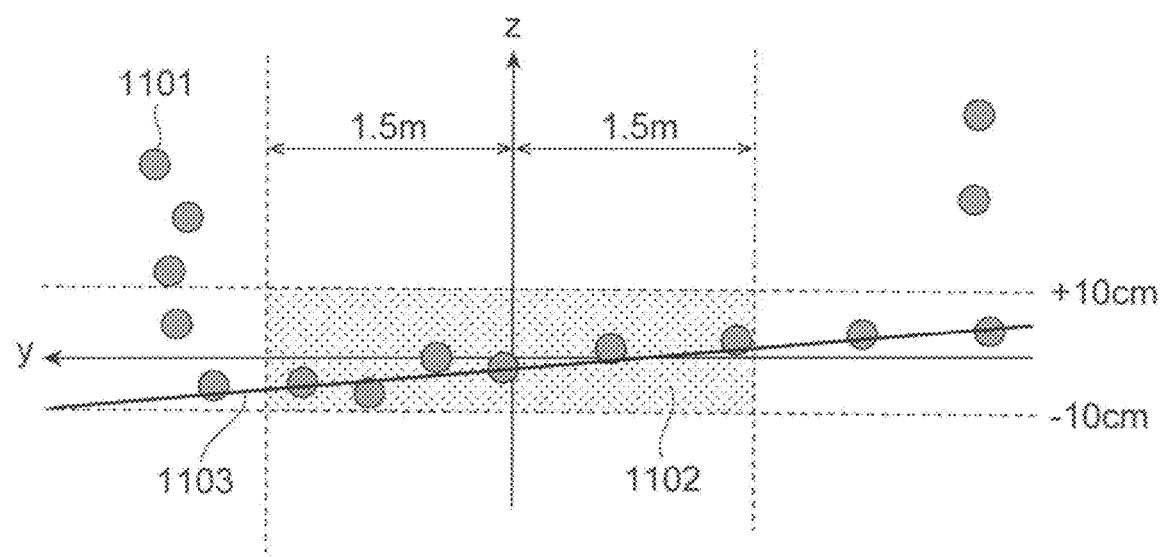
FIG. 11 is a yz plan view illustrating an example of a search range of the point cloud and a cross slope.

The processing of FIG. 10 is further described with reference to FIG. 11. FIG. 11 is an example of the yz plane in a certain layer, and is a yz plan view illustrating an example of the search coordinate range of the point cloud and the cross slope. A reference numeral 1101 is the point cloud, and an area 1102 is a region of the search yz-coordinate range in which y is set to ±1.5 m and z is set to ±10 cm. In step S1004, the point cloud 1101 existing in the area 1102 is obtained, and in step S1005, an approximate straight line 1103 is obtained from the point cloud 1101 existing in the area 1102. As a result, it becomes possible to calculate the approximate straight line of the feature point candidates.

Figure 12:
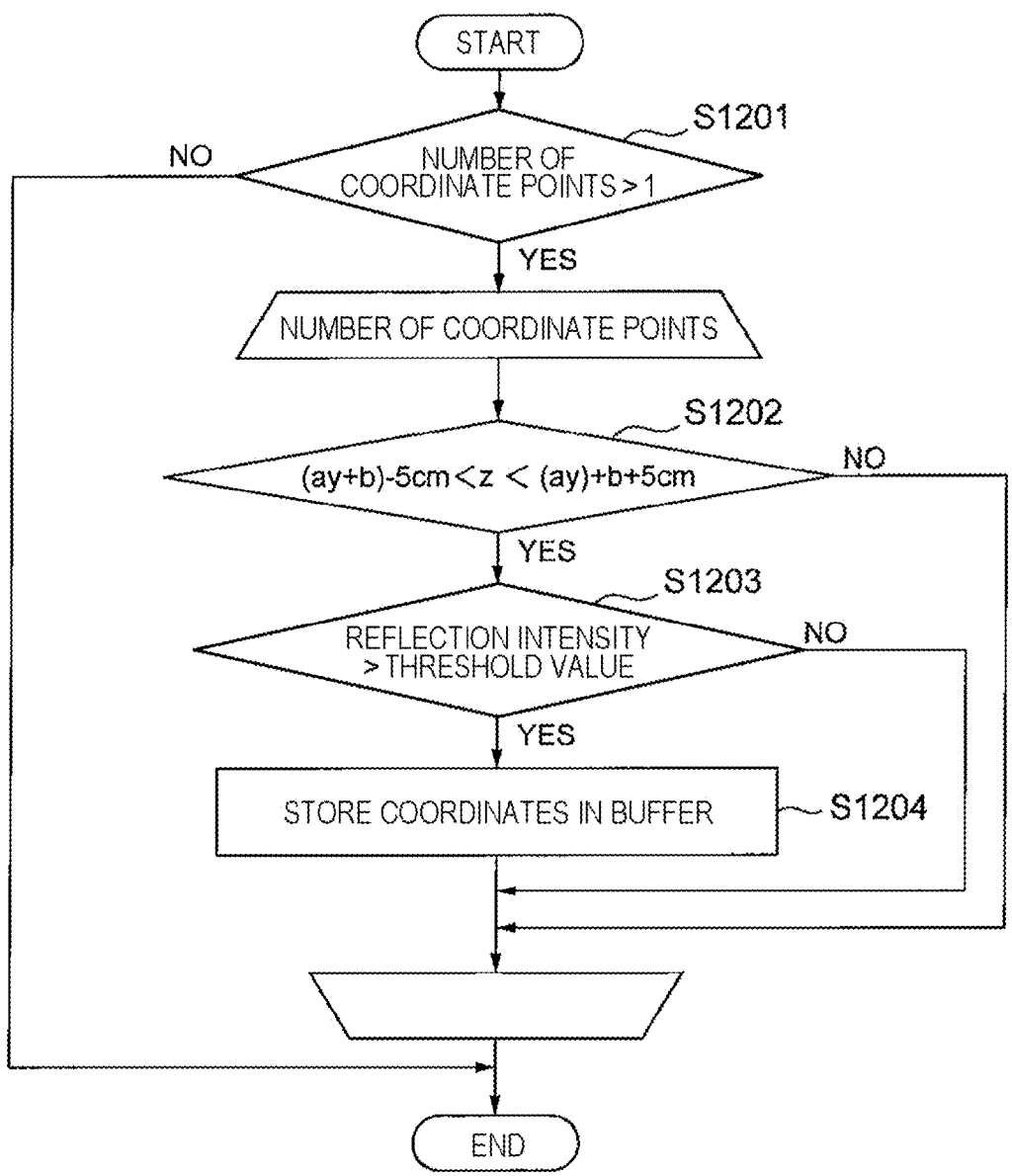
FIG. 12 is a flowchart of processing of obtaining feature point candidates of road surface painting.

FIG. 12 is a flowchart of processing for obtaining the feature point candidates of road surface painting. The processing illustrated in FIG. 12 corresponds to the processing of step S902. Step S902 is the processing for each layer, and the same applies to FIG. 12. First, in step S1201, the number of point clouds (coordinate points) on the road surface of the layer is checked. If the number of points on the road surface is one or less, the cross slope of the travel road has not been calculated, and thus the subsequent processing is not executed.

In the case in which the cross slope of the travel road has been calculated, the processing enters a loop for the number of point clouds (number of coordinate points) of the layer. In step S1202, it is determined whether or not the point cloud is within a predetermined z-coordinate range. Here, the processing of narrowing down the feature point candidates from the travel road end to a predetermined range is performed based on the cross slope of the travel road. Specifically, by using the values of a and b in the layer obtained in step S1205, it is determined whether the z-coordinate is within the range of ay+b±5 cm. ay+b is an equation of the cross slope of the road surface in the layer. In the present embodiment, whether or not it is on the road surface is determined by considering a margin of 5 cm vertically with respect to the equation of the cross slope of the road surface. Note that the margin of 5 cm can be optionally set, and is not limited to this value.

If a point is within this margin range, the point is regarded to be on the road surface, and the processing proceeds to step S1203. In step S1203, the reflection intensity at the coordinate point is determined. As described above, because the road surface painting includes the reflector, when the laser beam emitted from the laser radar 101 hits the reflector, a reflection intensity higher than that of the surrounding road surface can be obtained. In step S1203, it is determined whether or not the reflection intensity is higher than a threshold value. If the reflection intensity is higher than the threshold value, it is regarded that there is the road surface painting, and the coordinates are stored in the buffer in step S1204. The threshold value may be optionally set as long as the value can be used to distinguish between the road surface and the road surface painting.

Figure 13:
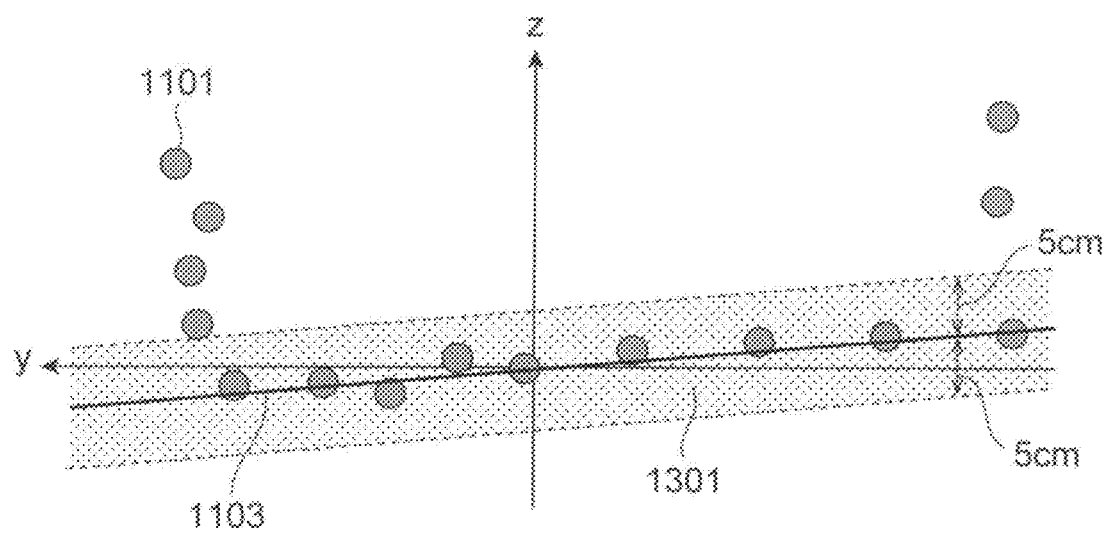
FIG. 13 is a yz plan view illustrating an example of a range in which the feature point candidates are extracted.

The processing of FIG. 12 is further described with reference to FIG. 13. FIG. 13 is the same yz plane as that shown in FIG. 11. In step S1202, an area 1301 is defined by setting a region of ±5 cm with respect to the value ay b of the z-coordinate of the approximate straight line 1103 in each y-coordinate. A point cloud in the area 1301 and has the reflection intensity higher than the threshold value is recognized as the feature point in step S1203.

Figure 14:
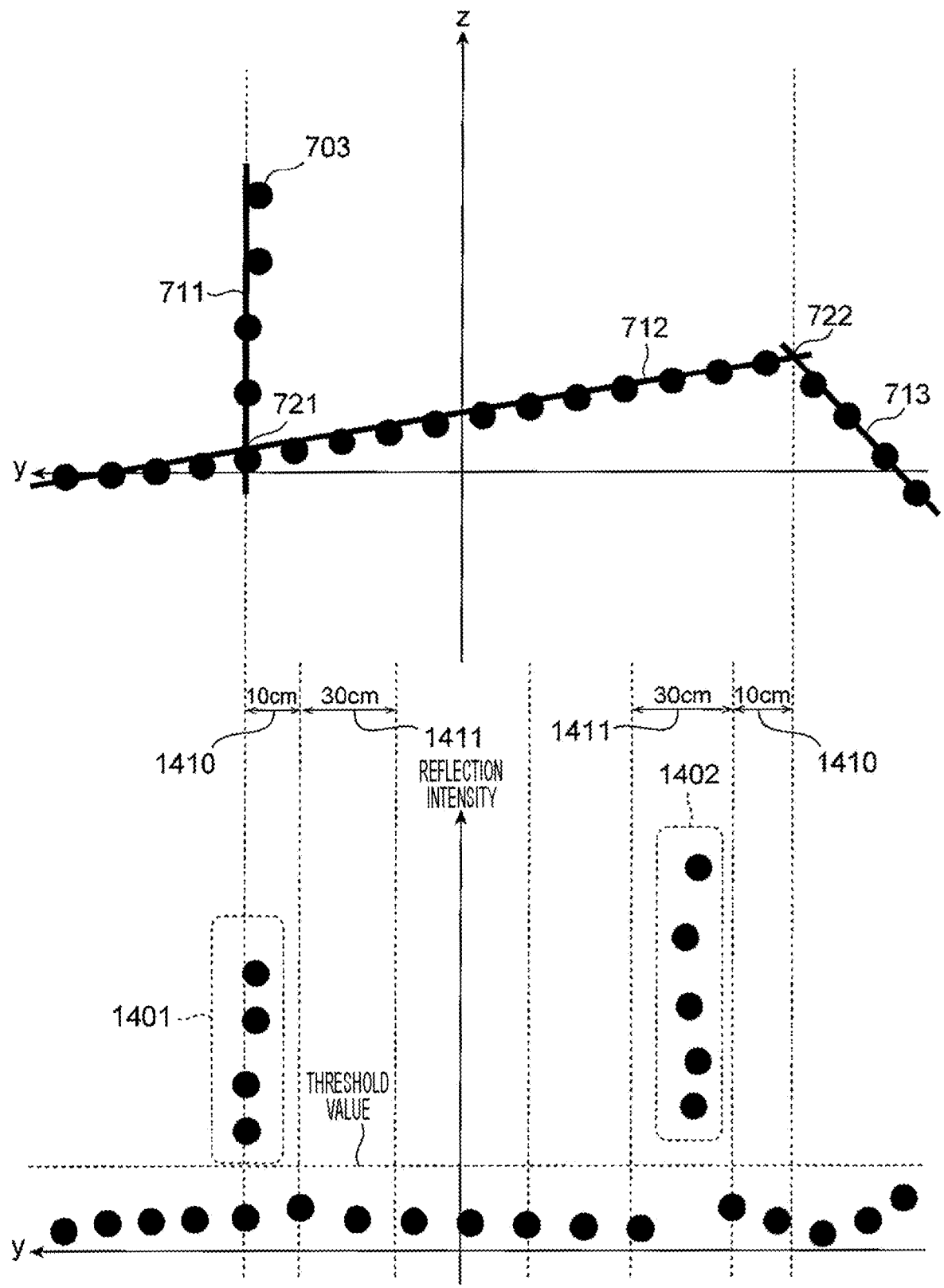
FIG. 14 is a diagram explaining an example of a relationship between a change point in a cross slope and a reflection intensity.

Next, the processing in step S903 is further described with reference to FIGS. 14 and 15. FIG. 14 is a diagram illustrating an example of a relationship between the reflection intensity and a slope change. The upper part of FIG. 14 illustrates the position of the point cloud in the yz plane, and the lower part of FIG. 14 illustrates the relationship between the y-coordinate of the point cloud and the reflection intensity.

In this relationship diagram, point clouds 1401 having the reflection intensity higher than the threshold value are appearing in the vicinity of the y-coordinate of the intersection point 721. Similarly, point clouds 1402 having the reflection intensity higher than the threshold value are also appearing in the vicinity of the intersection point 722. Therefore, these point clouds 1401 and 1402 become feature point candidates of the lane marking, and it is necessary to determine whether or not these are really lane markings.

In this regard, a margin 1410 of a distance (10 cm in the present embodiment) set in advance on the side closer to the own vehicle is taken along the y direction from each of the intersection points 721 and 722, and it is determined whether or not the point clouds having the reflection intensity higher than the threshold value are included in a width range (30 cm in the present embodiment) 1411 set in advance on the side further closer to the own vehicle from the margin. If the point cloud having the reflection intensity higher than the threshold value falls within the width range 1411, the point cloud is regarded as constituting the lane marking, and if the point cloud does not fall within the width range 1411, the point cloud is not regarded as the lane marking. In the example of FIG. 14, the point clouds 1401 having the reflection intensity higher than the threshold value do not fall within the width range 1411 and are determined not to be the lane marking, and the point clouds 1402 having the reflection intensity higher than the threshold value fall within the width range 1411 and are regarded to constitute the lane marking. Note that the value of the margin 1410 may be optionally set according to the situation, and is not limited to these values.

As described above, the structure can be distinguished from the road surface painting by determining the relationship between the slope change point and the reflection intensity. Then, in the case of the road surface painting, the road surface painting is highly possibly a white line, and thus, the processing of lane marking recognition is executed. This corresponds to the processing of step S904.

Figure 15:
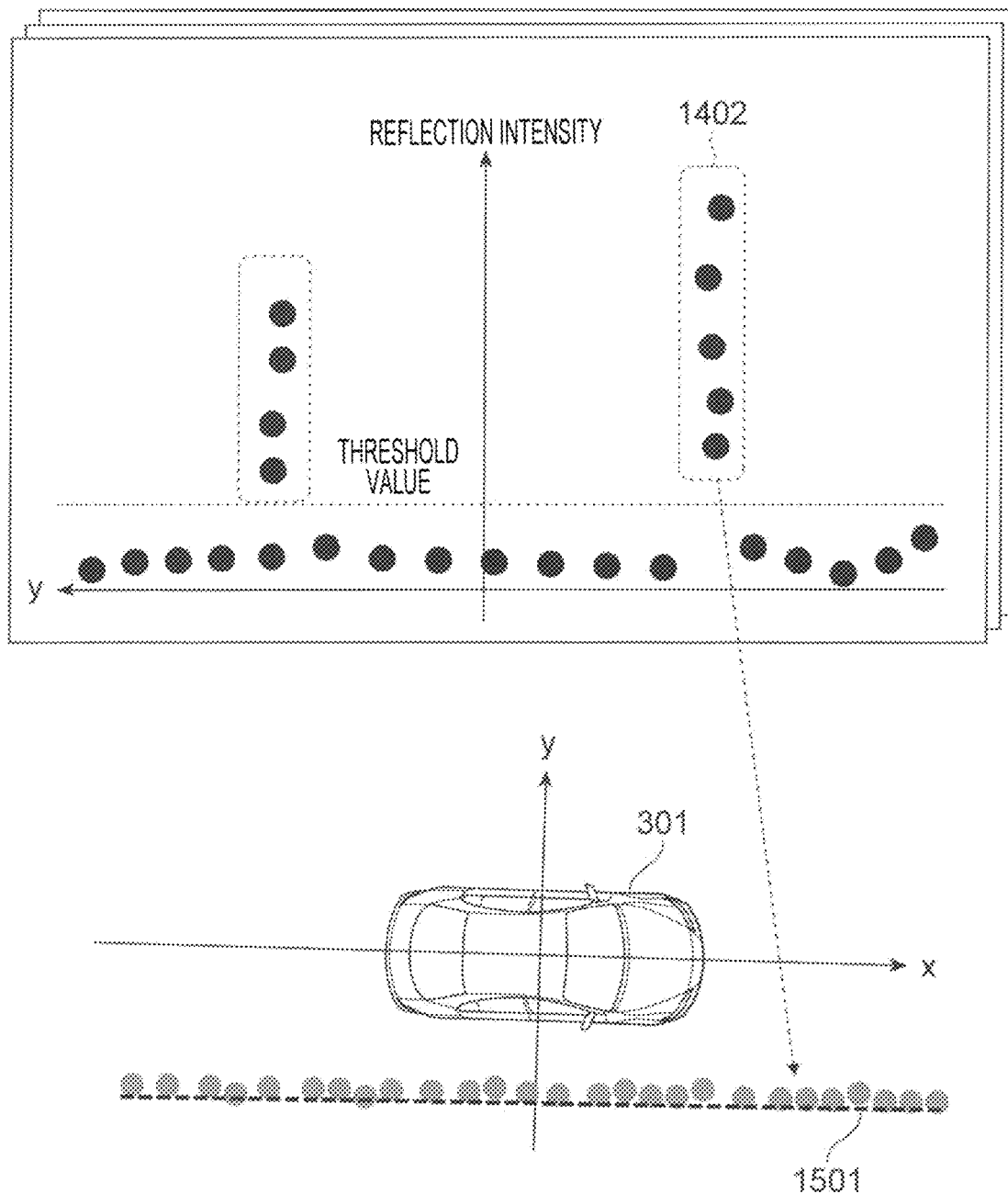
FIG. 15 is a view explaining processing of recognizing the lane marking using lane marking feature points.

FIG. 15 is a view illustrating the processing of recognizing the lane marking using the lane marking feature points.

The upper part of FIG. 15 illustrates the relationship between the y-coordinate of the point cloud and the reflection intensity for each layer, and the lower part of FIG. 15 is a diagram in which the point clouds 1402 having the reflection intensity higher than the threshold value in the upper part of FIG. 15 are developed on the xy plane for all layers.

Although the point clouds 1402 determined as the lane marking have three-dimensional coordinates, only the xy-coordinates are used because the point clouds are treated as points on the road surface when the lane marking is recognized. This state is illustrated in the lower part of FIG. 15. Note that the point clouds used in the lower part of FIG. 15 are the latest feature points obtained in all the layers at that time and the feature points obtained in the past. In this way, even if the data of the laser radar is sparse, it is possible to use the feature points of the amount necessary for the lane marking recognition. Then, by performing the processing of step S904 on these feature points, a line segment 1501 is obtained, and this is set as the travel road end of the travel road.

FIG. 16 illustrates a data structure of the point cloud DB 202. The data is a list of layer information 1600, and has the layer information 1600 for each layer. The layer information 1600 includes a layer number 1601, a number of points 1602, and point cloud information 1610. The point cloud information 1610 is a list for the number of points 1602.

The point cloud information 1610 includes an x-coordinate 1611, a y-coordinate 1612, a z-coordinate 1613, and a reflection intensity 1614. The x-coordinate 1611, the y-coordinate 1612, and the z-coordinate 1613 follow the coordinate system of FIG. 3.

FIG. 17 illustrates a voting space used in the Hough transform and a data structure of the voting space. A voting space 1750 holds ρθ cells 1751 of the number necessary for extraction of lines. The cell 1751 holds cell information 1700.

The cell information 1700 includes a number of votes 1701, end point 1 coordinates 1710, end point 2 coordinates 1720, and a voting point cloud 1730. The voting point cloud 1730 is a list for the number of votes 1701. The end point coordinates 1710 holds an x-coordinate 1711 and a y-coordinate 1712. Similarly, the end point 2 coordinates 1720 holds an x-coordinate 1721 and a y-coordinate 1722, and the voting point cloud 1730 holds an x-coordinate 1731 and a y-coordinate 1732.

Next, an example in which necessity of the travel road end recognition is determined by using a high precision map used in automatic driving is described.

Figure 18:
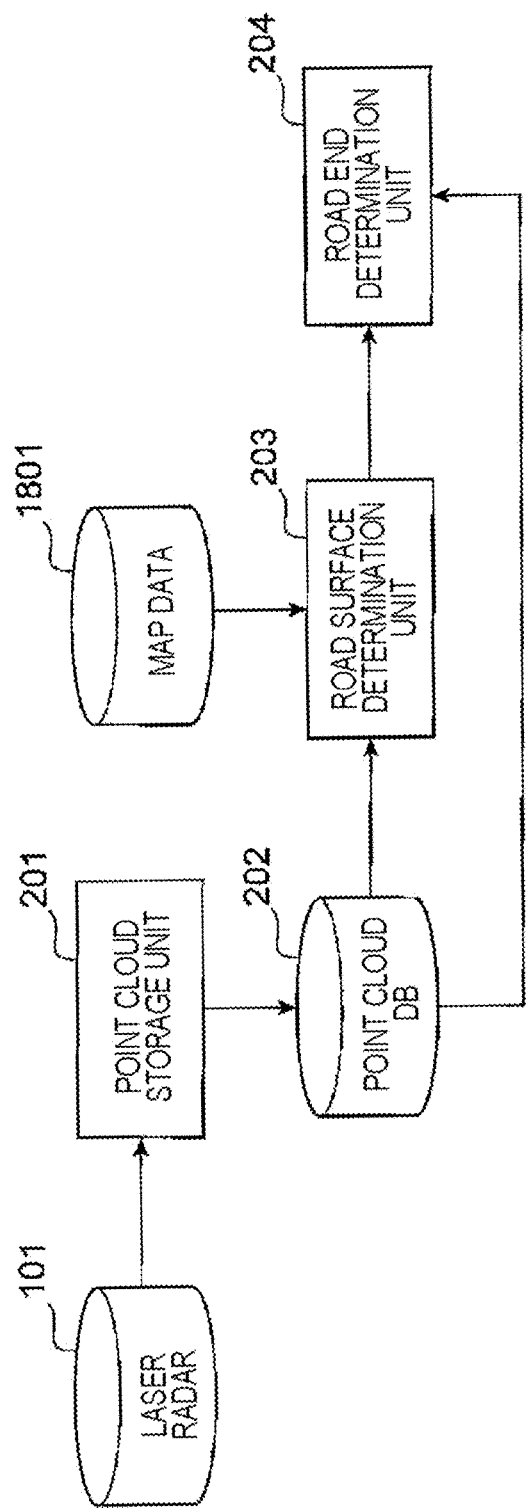
FIG. 18 is a diagram illustrating a software configuration example in the case in which map data is used in the travel road recognition device according to the embodiment of the present invention.

FIG. 18 illustrates an example of a software configuration. This is obtained by adding map data 1801 to the configuration of FIG. 2. The map data 1801 holds a high-precision map that enables route guidance by automatic driving. This is preferably held in the form of, for example, Geographic Data Files (GDF), which is a type of map format that is an international standard of the International Organization for Standardization (ISO).

Figure 19:
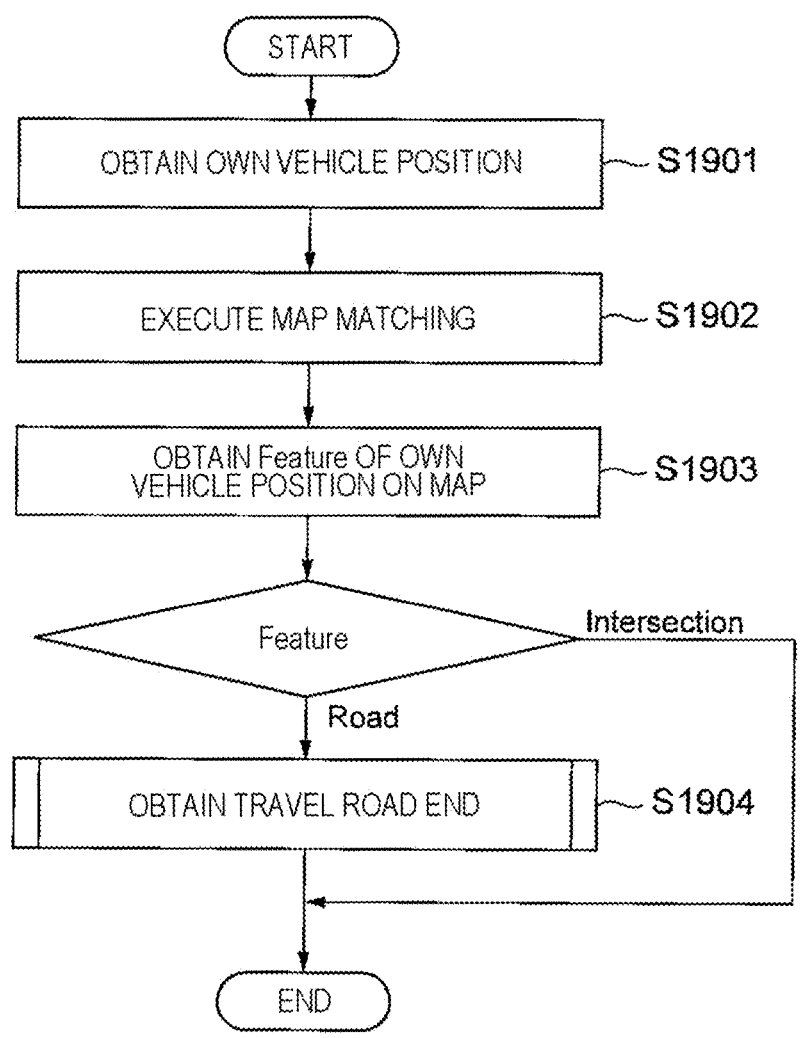
FIG. 19 is a flowchart of processing of the travel road recognition device in the case in which the map data is used.

FIG. 19 is a processing flow in the case in which the map data 1801 is used. This is to determine whether the own vehicle position is at an intersection or on a normal straight road, and to execute the travel road recognition only when the own vehicle position is on the straight road. In this case, it is assumed that the map data 1801 is stored in the GDF 5.0 format.

First, the own vehicle position is obtained in step S1901. The own vehicle position is acquired by a Global Navigation Satellite System (GNSS), dead reckoning, or the like. Next, map matching is executed in step S1902. As a result, a position of the own vehicle position obtained in step S1901 on the map data 1801 can be found.

When the own vehicle position on the map data 1801 is found, Feature of the own vehicle position in the map data 1801 is obtained in step S1903. In the GDF 5.0 format, all objects on the map are called Features. Features such as Road is defined for roads and Intersection is defined for intersections. Therefore, by determining this, the attribute of the traveling position of the own vehicle can be found.

Therefore, Feature is determined in step S1904. If Feature is Intersection, it is determined that the own vehicle position is the intersection, and the processing ends without doing anything. If Feature is Road, it is determined that the own vehicle position is on the straight road, and the processing proceeds to step S404 (see FIG. 4) to execute processing of obtaining the travel road end. Therefore, the processing of obtaining the travel road end can be performed only while the own vehicle 301 is traveling on the straight road, and the processing of obtaining the travel road end can be omitted at the intersection. Therefore, it is possible to reduce the calculation load of the device and realize the configuration with lower specifications.

The travel road recognition device according to the present embodiment obtains the cross slope of the travel road based on the point cloud data obtained by the laser radar 101, and obtains the coordinate values of the travel road end based on the coordinate values of the change point at which the slope angle changes. According to the traveling road recognition device of the present embodiment, it is possible to accurately recognize the traveling road end of the traveling road on which the own vehicle is traveling, and the automatic driving vehicle can be safely operated.

In the conventional camera, it is possible to recognize a size of an object such as a structure whose shape can be clearly recognized by human eyes, but it is almost impossible to recognize a small slope of an apparently flat surface such as the cross slope of the road. In addition, the camera has a disadvantage that the recognition performance greatly changes depending on the surrounding brightness and weather.

On the other hand, in the travel road recognition device according to the present embodiment, the laser radar is used to obtain the cross slope of the travel road that could not have been recognized by the conventional camera, and from the cross slope, the coordinate values of the travel road end is obtained. Therefore, unlike the conventional camera, three-dimensional coordinates and reflection intensity of a detection target can be easily measured without depending on the surrounding brightness and weather, and more robust recognition performance can be expected.

In addition, the travel road recognition device of the present embodiment recognizes the road surface painting using the reflection intensity, and determines whether or not the road surface painting is the lane marking from the relationship of the reflection intensity with the position of the change point. In the case of recognizing the road signs and lane markings on the road surface, because these are drawn using the same paint, it is difficult to distinguish between the lane marking and the road sign only by the reflection intensity, and it is difficult to distinguish between the lane marking and an object other than the lane marking such as a vehicle. Sometimes the lane marking cannot be detected due to the paint becoming faint or the like, and in that case, it is difficult to recognize the road end.

On the other hand, in the travel road recognition device of the present embodiment, the lane marking can be distinguished from the road sign based on the positional relationship between the reflection intensity and the change point, and thus erroneous detection of the travel road end can be prevented.

In addition, even when the lane marking cannot be detected due to the paint becoming faint or the like, the travel road end can be recognized and the travel road can be accurately grasped in the automatic driving, and thereby a situation of the vehicle deviating from the road can be avoided.

It should be noted that the present invention is not limited to the above-described examples, but includes various modifications. For example, the above-described examples have been described in detail in order to explain the present invention in an easy-to-understand manner, and are not necessarily limited to those including all the configurations described.

For example, a part of the configuration of one example can be replaced with the configuration of another example, and the configuration of another example can be added to the configuration of one example. Further, for a part of the configuration of each example, another configuration can be added, deleted, or substituted.

Moreover, each of the above-described configurations, functions, processing units, processing means, and the like may be partially or entirely realized by hardware by designing using such as an integrated circuit. Further, each of the above-described configurations, functions, and the like may be realized by software by such as a processor interpreting and executing a program for realizing each of the functions. The information such as a program, a table, and a file that realize each of the functions can be placed in a recording device such as a memory, a hard disk, or a Solid State Drive (SSD), or in a recording medium such as an integrated circuit (IC) card, a secure digital (SD) card, or a digital versatile disc (DVD).

Further, control lines and information lines are shown which are considered necessary for explanation, and not all the control lines and the information lines on the product are necessarily shown. In practice, almost all configurations may be considered to be connected to each other.

Although the embodiment of the present invention has been described in detail above, the present invention is not limited to the above embodiment, and various design changes can be made without departing from the spirit of the present invention described in the claims. For example, the above-described embodiment has been described in detail in order to explain the present invention in an easy-to-understand manner, and is not necessarily limited to that including all the configurations described. For example, a part of the configuration of one embodiment can be replaced with the configuration of another embodiment, and the configuration of another embodiment can be added to the configuration of one embodiment. Further, for a part of the configuration of each embodiment, another configuration can be added, deleted, or substituted.

REFERENCE SIGNS LIST 101 laser radar
201 point cloud storage unit
202 point cloud DB
203 road surface determination unit
204 road end determination unit
801 road end calculation unit
802 feature point candidate extraction unit
803 feature point determination unit
804 lane marking recognition unit

The invention claimed is:

1. A travel road recognition device that recognizes a travel road end of a travel road on which an own vehicle travels, comprising:
a laser radar that emits a laser beam from the own vehicle toward the travel road;
a road surface determination unit that obtains a cross slope of the travel road based on coordinate values of a point cloud obtained by the laser radar; and
a road end determination unit that obtains a change point at which a slope angle changes in the cross slope of the travel road obtained by the road surface determination unit, and obtains coordinate values of at least one travel road end of both sides in a cross direction of the travel road based on the coordinate values of the change point, wherein
the laser radar acquires data of a point cloud for each of a plurality of layers at predetermined intervals in a direction away from the own vehicle,
the road surface determination unit sets a search coordinate range in which the point cloud is searched for each of the plurality of layers, the search coordinate range defined by a radius surrounding the own vehicle, and obtains the cross slope of the travel road using a point cloud existing within the search coordinate range, and
the road surface determination unit updates the coordinate values of the point cloud by converting the coordinate values according to a rotation matrix and a translation matrix in response to a determination that the coordinate values are within the search coordinate range, and deleting the coordinate values from the point cloud in response to a determination that the coordinate values are outside of the search coordinate range.

2. The travel road recognition device according to claim 1, wherein the road end determination unit detects a road surface of the travel road and a structure installed on at least one travel road end of the travel road based on the coordinate values of the point cloud, obtains coordinate values of a change point of height between the road surface of the travel road and the structure, and obtains a position of the travel road end based on the coordinate values of the change point of height.

3. The travel road recognition device according to claim 1, further comprising:
a feature point candidate extraction unit that extracts a point cloud having a reflection intensity higher than a threshold value from among point clouds obtained by the laser radar as a feature point candidate of a lane marking marked on the travel road;
a feature point determination unit that obtains a feature point of the lane marking from among the feature point candidates based on coordinate values of the travel road end; and
a lane marking recognition unit that recognizes the lane marking based on the feature point obtained by the feature point determination unit.

4. The travel road recognition device according to claim 3, wherein the feature point determination unit obtains a feature point of the lane marking from among the feature point candidates by narrowing down the feature point candidates to a predetermined range based on the cross slope of the travel road.

5. The travel road recognition device according to claim 1, further comprising map information related to a region where the own vehicle is traveling,
wherein the road surface determination unit determines whether a travel road on which the own vehicle is traveling is a straight road or an intersection by using the map information, and
the road end determination unit executes processing of obtaining coordinate values of the travel road end when the road surface determination unit determines that the travel road is the straight road.

* * * * *